United States Patent
Kobayashi et al.

(10) Patent No.: US 11,400,686 B2
(45) Date of Patent: Aug. 2, 2022

(54) ANTIFOULING STRUCTURE AND AUTOMOTIVE COMPONENT USING ANTIFOULING STRUCTURE

(71) Applicant: NISSAN MOTOR CO., LTD., Yokohama (JP)

(72) Inventors: Ryota Kobayashi, Kanagawa (JP); Yuji Noguchi, Kanagawa (JP); Ryo Murakami, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 71 days.

(21) Appl. No.: 16/308,973

(22) PCT Filed: Jun. 13, 2016

(86) PCT No.: PCT/JP2016/067487
§ 371 (c)(1),
(2) Date: Dec. 11, 2018

(87) PCT Pub. No.: WO2017/216831
PCT Pub. Date: Dec. 21, 2017

(65) Prior Publication Data
US 2019/0255802 A1    Aug. 22, 2019

(51) Int. Cl.
*B32B 3/30* (2006.01)
*B32B 17/06* (2006.01)
(Continued)

(52) U.S. Cl.
CPC .............. *B32B 5/18* (2013.01); *B32B 3/30* (2013.01); *C09D 5/16* (2013.01); *C09D 5/1681* (2013.01);
(Continued)

(58) Field of Classification Search
CPC .......... B32B 3/30; B32B 5/18; B32B 17/064; B32B 2305/026; B32B 2307/538;
(Continued)

(56) References Cited

U.S. PATENT DOCUMENTS

2014/0147627 A1    5/2014  Aizenberg et al.
2014/0290731 A1   10/2014  Aizenberg et al.
(Continued)

FOREIGN PATENT DOCUMENTS

EP    2868628 A1 *  5/2015  ............. C01B 33/12
JP    2014-509959 A    4/2014
(Continued)

OTHER PUBLICATIONS

Dupont, "DuPont(TM) Grytox(R) Performance Lubricants," 2002, E.I. du Pont de Nemours and Company, pp. 1-2 (Year: 2002).*

*Primary Examiner* — Maria V Ewald
*Assistant Examiner* — Ethan Weydemeyer
(74) *Attorney, Agent, or Firm* — Foley & Lardner LLP

(57) ABSTRACT

The antifouling structure of the present invention includes a porous structural layer and a non-volatile liquid in pores and/or on a surface of the porous structural layer. The porous structural layer includes a modified portion at least at a surface part of the porous structural layer, and the elemental ratio of fluorine to silicon (F/Si) in the surface part is within the range of 3 to 50.

12 Claims, 4 Drawing Sheets

(51) Int. Cl.
*C09D 5/16* (2006.01)
*C09D 7/65* (2018.01)
*B32B 5/18* (2006.01)

(52) U.S. Cl.
CPC .......... *C09D 7/65* (2018.01); *B32B 2305/026* (2013.01); *B32B 2307/538* (2013.01); *B32B 2313/00* (2013.01); *B32B 2327/12* (2013.01); *B32B 2605/08* (2013.01)

(58) Field of Classification Search
CPC ............ B32B 2313/00; B32B 2327/12; B32B 2605/08; C09D 7/65; C09D 5/16; C09D 5/1681
See application file for complete search history.

(56) References Cited

U.S. PATENT DOCUMENTS

| | | |
|---|---|---|
| 2014/0290732 A1 | 10/2014 | Aizenberg et al. |
| 2016/0025899 A1 | 1/2016 | Ishizeki et al. |
| 2017/0015835 A1 | 1/2017 | Aizenberg et al. |
| 2018/0127594 A1 | 5/2018 | Aizenberg et al. |
| 2018/0187022 A1 | 7/2018 | Aizenberg et al. |

FOREIGN PATENT DOCUMENTS

| | | | |
|---|---|---|---|
| WO | WO-2008120505 A1 * | 10/2008 | ............ B60J 1/2094 |
| WO | WO-2012/100099 A2 | 7/2012 | |
| WO | WO-2014/175124 A1 | 10/2014 | |
| WO | WO-2015/145703 A1 | 10/2015 | |
| WO | WO-2015/155830 A1 | 10/2015 | |

* cited by examiner

ANTIFOULING STRUCTURE AND AUTOMOTIVE COMPONENT USING ANTIFOULING STRUCTURE

TECHNICAL FIELD

The present invention relates to an antifouling structure. In more detail, the present invention relates to an antifouling structure that secures the surface energy enough to be sufficiently wet by a non-volatile liquid and that also secures the capillary force of a porous structural layer by preventing pores from being clogged by a modified portion, and to an automotive component using the antifouling structure.

BACKGROUND ART

There have been articles having a slippery surface that repels foreign matters. For example, Patent Document 1, JP2014-509959A, describes an article in which a lubricating liquid is stabilized on a base having a porous structure so that the capillary network of the porous structure forms a water-repellent surface on the surface of the base to repel foreign matters so as to reduce adhesion of the foreign matters.

CITATION LIST

Patent Document

Patent Document 1: JP2014-509959A
SUMMARY OF INVENTION

Technical Problem

A self-restoring antifouling structure retains a non-volatile liquid in pores of its porous structure, and the non-volatile liquid wets the surface of the porous structure to form a smooth surface. The self-restoring antifouling structure thus exerts the antifouling effect for a long time. Accordingly, it is preferred that the porous structure has high affinity for the non-volatile liquid particularly at the surface part thereof, and a modified portion having affinity for the non-volatile liquid is formed for this reason.

Patent Document 1 discloses chemically modifying the surface of a base having a porous structure to achieve the desired surface energy of the base.

However, the modification density of the base surface is not considered in Patent Document 1, and the droplet sliding property and the retention of a lubricating liquid are still insufficient.

The present invention has been made in view of the problem in the prior art, and an object thereof is to provide an antifouling structure that secures surface energy enough to be sufficiently wet by a non-volatile liquid and in which pores are not clogged by a modified portion, and an automotive component using the antifouling structure.

Solution to Problem

As a result of a keen study for achieving the above-described object, the present inventors found that the non-volatile liquid can wet the surface of the porous structure and also be retained in the porous structure when the elemental ratio of fluorine to silicon (F/Si) is within a desired range at the surface part in the surface of the porous structural layer that retains the non-volatile liquid. The present invention was thus completed.

That is, the antifouling structure of the present invention comprises a porous structural layer and a non-volatile liquid in pores and/or on a surface of the porous structural layer.

Further, the porous structural layer comprises a modified portion in a surface part thereof, and an elemental ratio of fluorine to silicon (F/Si) in the surface part is within the range of 3 to 50.

The automotive component of the present invention comprises the above-described antifouling structure.

Advantageous Effects of Invention

In the present invention, the percentage of modification of the surface of the porous structural layer that retains the non-volatile liquid is within the desired range. With this configuration, it is possible to provide the antifouling structure in which the non-volatile liquid can wet the surface part of the porous structural layer and also be retained in the porous structural layer.

DESCRIPTION OF EMBODIMENTS

Figure 1:
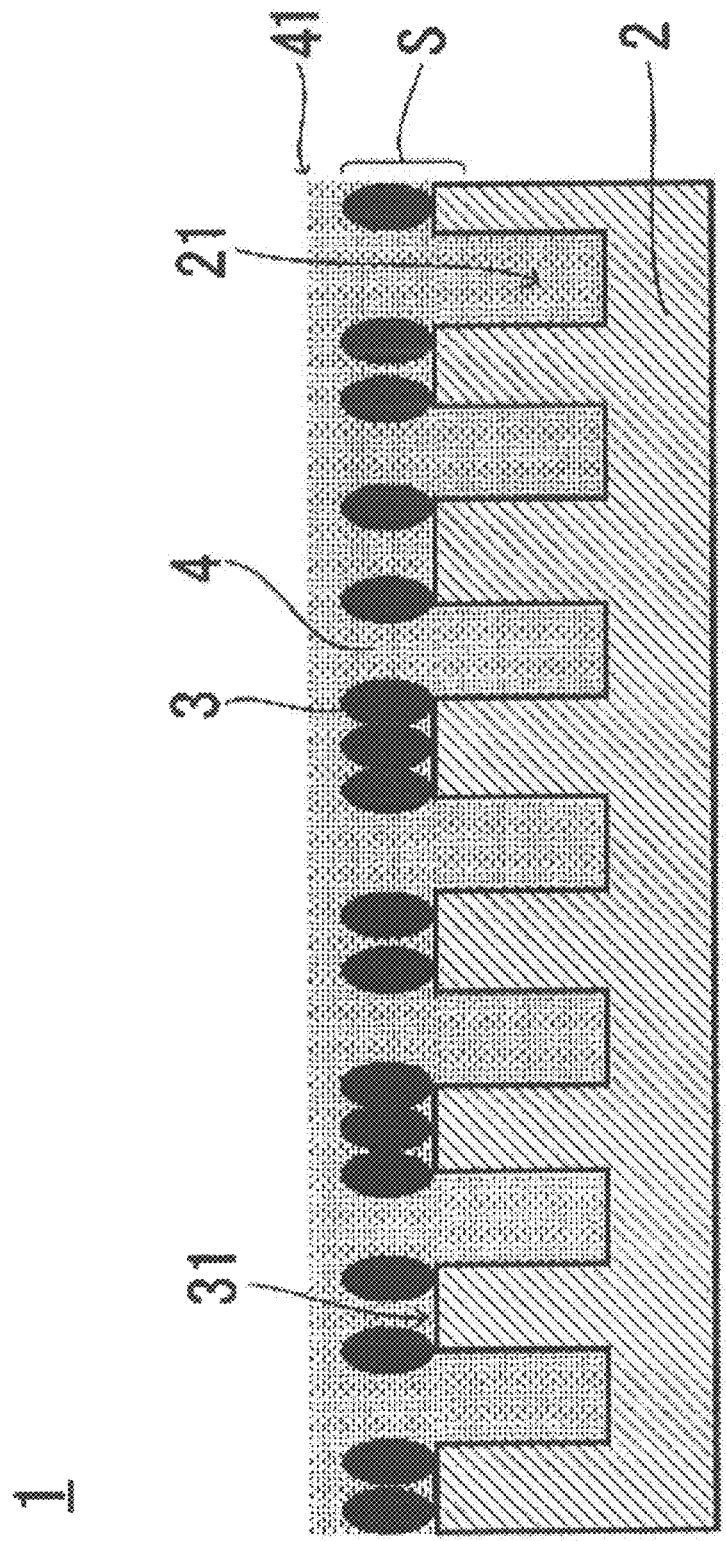
FIG. 1 is a schematic cross-sectional view of the antifouling structure of the present invention.

The antifouling structure of the present invention will be described in detail. As illustrated in FIG. 1, an antifouling structure 1 comprises a porous structural layer 2 and a non-volatile liquid 4.

The non-volatile liquid 4 is retained in pores 21 and/or on a surface of the porous structural layer 2, and the non-volatile liquid 4 wets a surface part S of the porous structural layer 2 to form a smooth surface 41 so as to prevent adhesion of dirt.

Porous Structural Layer

The porous structural layer 2 is a so-called sponge-like structure in which a plurality of mutually communicated pores is three-dimensionally and randomly arranged. The porous structural layer 2, which comprises a modified portion 3 having high affinity for the non-volatile liquid 4 at least at the surface part S, retains the non-volatile liquid 4 in the pores 21 and/or on the surface.

The modified portion 3 may also be formed inside the pores of the porous structural layer 2.

The porous structural layer 2 may be made of any material that has high light transmittance. For example, inorganic materials mainly composed of silicon oxide can be used. Such inorganic materials include materials that contains silicon oxide ($SiO_2$) in the amount of 60 wt % or more such as quartz glass, soda glass and borosilicate glass.

A modifier that forms the modified portion 3 may contain a compound having a fluoride functional group that can bind to a material of the porous structural layer 2. Such compounds having a fluoride functional group include fluorine silane coupling agents known in the art such as alkoxy oligomers having a fluoride functional group.

The elemental ratio of fluorine to silicon (F/Si) is within the range of 3 to 50 at the surface part S of the porous structural layer of the present invention.

The elemental ratio (F/Si) represents the density of modification by fluorine at the surface part S of the porous structural layer 2. When the elemental ratio (F/Si) is within the range of 3 to 50, the surface energy of the surface part of the porous structural layer can be reduced. This allows the non-volatile liquid to sufficiently wet the surface part S and can ensure the capillary force generated in the porous structural layer by preventing the pores from being clogged by the modified portion.

Figure 2:
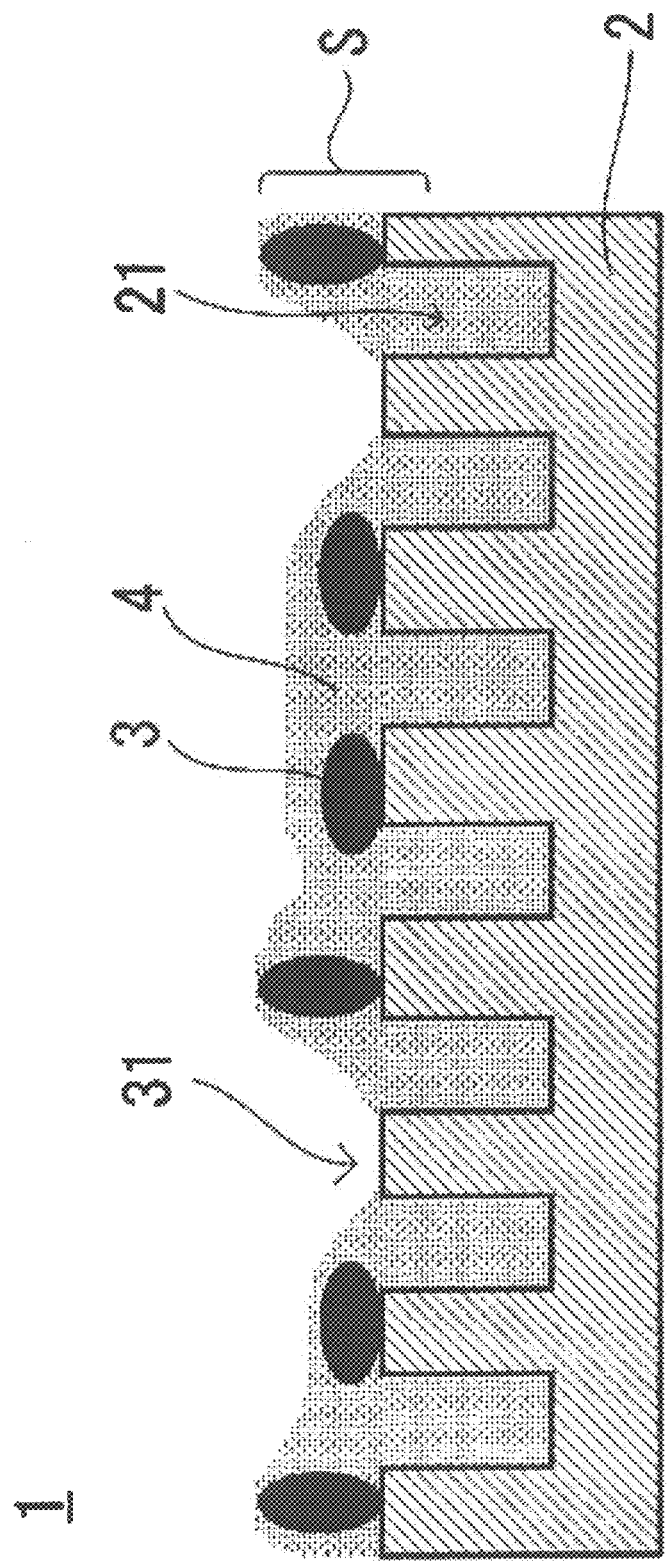
FIG. 2 is a schematic cross-sectional view of an antifouling structure of Comparative Example 3.

When the elemental ratio (F/Si) is less than 3, the surface energy of the surface part is not sufficiently reduced. As illustrated in FIG. 2, the non-volatile liquid 4 does not sufficiently wet the surface part S of the porous structural layer 2, and dirt is pinned to a non-modified portion 31, i.e. the portion where the porous structural layer is exposed, and less likely to slide off from the antifouling structure 1.

Figure 3:
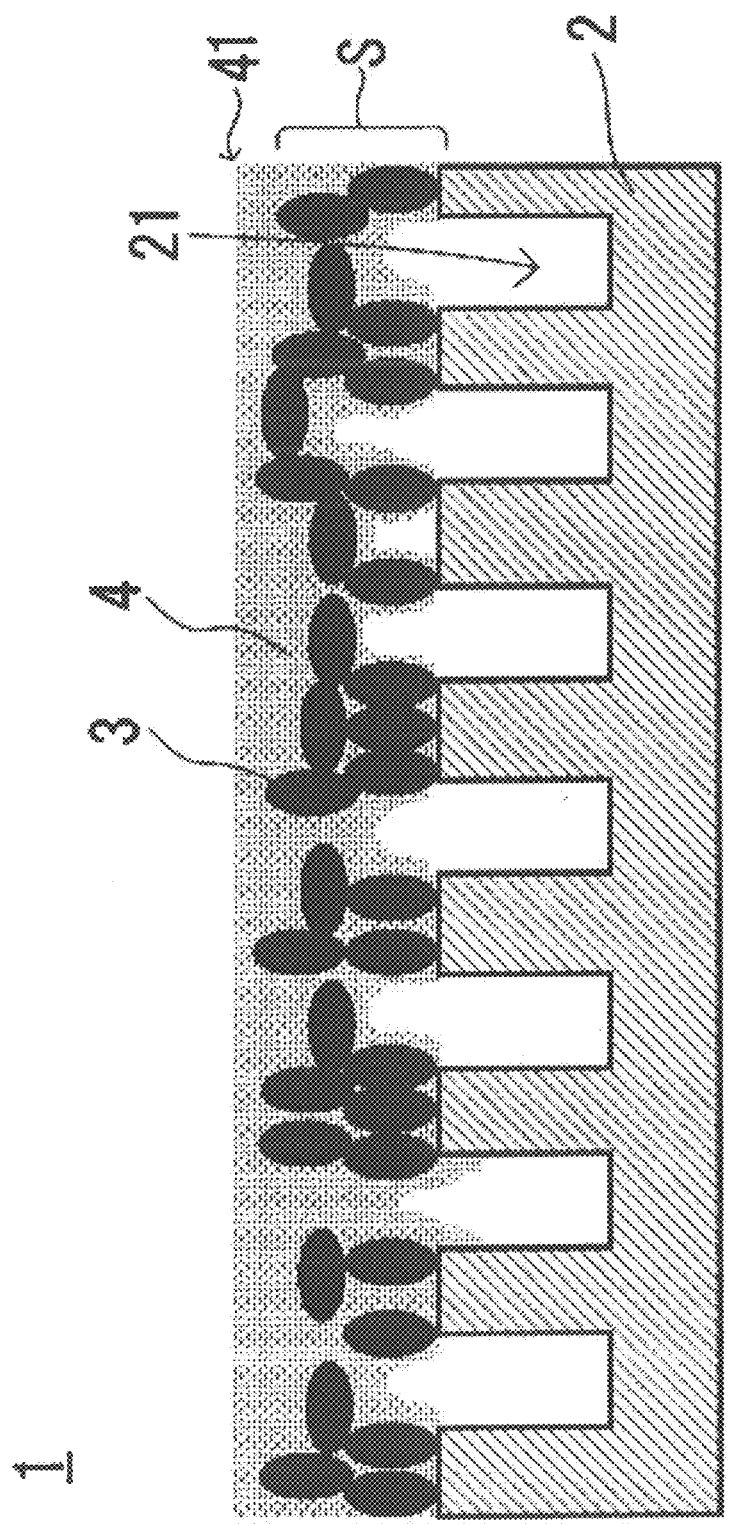
FIG. 3 is a schematic cross-sectional view of an antifouling structure of Comparative Example 1.

When the elemental ratio (F/Si) is greater than 50, apertures of the pores 21 of the porous structural layer 2 are clogged by the modified portion 3 as illustrated in FIG. 3. Since the non-volatile liquid 4 is less likely to penetrate into the pores of the porous structural layer, the resistance to sliding abrasion is decreased.

The elemental ratio of fluorine to silicon (F/Si) in the surface part of the porous structural layer of the present invention is preferably within the range of 3 to 20, more preferably within the range of 3.3 to 7.1.

When the elemental ratio (F/Si) is within the range of 3 to 20, the non-volatile liquid sufficiently penetrates into the pores, and the resistance to sliding abrasion is improved. When the elemental ratio (F/Si) is within the range of 3.3 to 7.1, the surface energy of the surface part of the porous structural layer is sufficiently reduced. This allows the non-volatile liquid to sufficiently wet the surface part and can also secure the capillary force generated by the porous structural layer.

As described above, the surface part of the porous structural layer 2 retains the non-volatile liquid by the capillary force. The surface part serves as an inlet for the non-volatile liquid that penetrates into the pores 21. The surface part is an area which includes inner walls of the pores around the apertures as well as the outer surface of the porous structural layer.

The elemental ratio of fluorine to silicon (F/Si) in the surface part S of the porous structural layer can be measured by X-ray photoelectron spectroscopy (XPS or ESCA (electron spectroscopy for chemical analysis)).

When the surface part S of the porous structural layer is analyzed by XPS, fluorine of the modifier is detected since the porous structural layer is covered with the modifier in the modified portion 3. In contrast, silicon of the porous structural layer 2 is detected in the non-modified portion 31 since the material of the porous structural layer 2 is exposed on the surface.

In the present invention, the elemental ratio of fluorine to silicon (F/Si) in the surface part S was measured by an elemental analysis using an XPS analyzer (QUANTUM-2000, PHI Corp), in which the porous structural layer with the modified portion is elementally analyzed from the outermost surface to a depth of approximately 5 nm.

In the XPS analysis of the surface part of the porous structural layer, a sample was immersed in a fluorine solvent and washed by ultrasonic wave to remove the non-volatile liquid retained in the porous structural layer.

The thickness of the porous structural layer is preferably within the range of 50 nm to 1000 nm. When the thickness of the porous structural layer is less than 50 nm, the amount of non-volatile liquid retained may be decreased, which results in the decreased durability of the antifouling structure. When the thickness is greater than 1000 nm, cracks may be more likely to be formed due to volume shrinkage in the production of the porous structural layer. Further, the haze may be increased.

For example, the thickness of the porous structural layer can be adjusted by changing the dilution ratio (viscosity) of a porous structural layer coating solution, the coating speed and the like.

The average diameter of the pores of the porous structural layer is preferably within the range of 10 nm to 100 nm. When the average diameter of the pores is less than 10 nm, it may be difficult to force the non-volatile liquid such as fluorine oil to penetrate into the pores of the porous structural layer. Accordingly, it may be difficult to retain the non-volatile liquid in the porous structural layer.

When the average diameter of the pores is greater than 100 nm/n, the haze may be increased and the all-optical transmittance may be decreased due to Rayleigh scattering or the like.

The average diameter of the pores was determined by photographing the surface of the porous structural layer from above under a scanning electron microscope (SEM), measuring the area of apertures in a field of view by image analysis and determining the diameter of circles having the same area of the apertures of the pores.

For example, the average diameter of the pores can be adjusted by changing the time immediately after coating a base by a raw material of the porous structural layer until drying it by heat in the production of the porous structural layer or by changing the film thickness applied in the production of the porous structural layer.

Specifically, the average diameter of the pores of the porous structural layer can be increased by extending the time after coating until drying by heat or by increasing the film thickness applied in the production of the porous structural layer.

The surface roughness (Ra) of the porous structural layer is preferably within the range of 10 nm to 100 nm.

When the surface roughness is greater than 100 nm, influence of the surface shape of the porous structural layer is increased, and the antifouling effect may be decreased due to difficulty in forming the smooth surface of the non-volatile liquid.

The surface roughness (Ra) of the porous structural layer can be measured by an atomic force microscope (AFM).

Non-Volatile Liquid

The non-volatile liquid wets the surface part S of the porous structural layer with the modified portion to form the smooth surface 41 on the outermost surface of the antifouling structure. The non-volatile liquid thereby repels foreign matters such as water, oil, sand and dust so as to reduce adhesion of the foreign matters.

The non-volatile liquid may be a liquid having low surface energy. For example, fluorine oils and silicone oils can be used.

Such fluorine oils include fluoropolyether oils, perfluoropolyether oils and the like. It is preferred to use fluorine oils including a main chain having a fluoropolyether.

Silicone oils that can be used include straight-chain or cyclic silicone oils. Such straight-chain silicone oils include so-called straight silicone oils and modified silicone oils. Such straight silicone oils include dimethyl silicone oil, methylphenyl silicone oil and methylhydrogen silicone oil.

Such modified silicone oils include straight silicone oils that are modified with a polyether, a higher fatty acid ester, a fluoroalkyl, an amino, an epoxy, a carboxyl, an alcohol or the like.

Examples of cyclic silicone oils include cyclic dimethylsiloxane oil and the like.

The non-volatile liquid has a viscosity at 0° C. of preferably 160 mm$^2$/s or less, more preferably from 8 mm$^2$/s to 80 mm$^2$/s.

When the viscosity of the non-volatile liquid is greater than 160 mm$^2$/s, the heat resistance (resistance to runoff) is increased while the water repellency and the antifouling effect may be decreased. When the viscosity is less than 8 mm$^2$/s, the low viscosity at high temperature may result in the decreased heat resistance. That is, the resistance to run off at high temperature may be decreased.

Regarding the viscosity of the non-volatile liquid, the evaporation loss in an environment of 120° C. after 24 hours is preferably less than 35 mass %. When the evaporation loss is 35 mass %, the antifouling structure can have good durability.

For example, in an automobile usage, deterioration of the performance due to natural evaporation of the non-volatile liquid is less likely to occur, and the antifouling effect can last for a long time around ordinary temperature (5° C. to 35° C.).

The evaporation loss can be determined by spreading 30 g of the non-volatile liquid on a 40φ petri dish and heating it at 120° C. for 24 hours.

Base

The antifouling structure of the present invention may comprise a base on the opposite side of the porous structural layer from the surface part.

The base may be made of an inorganic material such as glass or a steel plate, and the like.

Method of Producing Antifouling Structure

In a method of producing the antifouling structure of the present invention, the porous structural layer is formed by a sol-gel method in a first step. Specifically, the porous structural layer can be formed by turning a solution containing the material of the porous structural layer into a sol by hydrolysis and polymerization, applying the sol onto the base or the like, allowing the reaction to further proceed to turn the sol into gel, and drying and calcining it.

For example, the sol can be applied by a method known in the art such as spin coating, spraying, a roll coater, flow coating or dip coating.

Then, the surface part of the porous structural layer are modified by the modifier such as the above-described silane coupling agent by a method known in the art such as reflux, vapor deposition or immersion to form the modified portion, and the surface part is impregnated with the non-volatile liquid such as fluorine oil. The antifouling structure of the present invention can be thus produced.

Antifouling Structure

It is preferred that the antifouling structure has an all-optical transmittance of 90% or more and a haze (Hz) of less than 1%. When the all-optical transmittance and the haze are within these ranges, the antifouling structure satisfies transparency required for automotive components and optical parts.

The all optical transmittance can be measured by setting a sample film in a measurement device with an integrating sphere defined by JIS K7136, emitting light to the front side of the sample and capturing the light that has transmitted the antifouling structure by using the integrating sphere.

The haze can be measured according to JIS K7136 with a haze/transmittance meter (Murakami Color Research Laboratory).

Automotive Component

The automotive component of the present invention comprises the antifouling structure of the present invention. With the antifouling structure, the automotive component can maintain high antifouling effect for a long time. Accordingly, it can reduce the frequency of car wash or cleaning and secure a good view in a rain or on a dirt road.

Such automotive components include camera lenses, mirrors, glass windows, painted surfaces of bodies and the like, various light covers, door handles, meter panels, window panels, radiator fins, evaporators and the like. However, the automotive component is not limited thereto.

EXAMPLES

Hereinafter, the present invention will be described in more detail with examples. However, the present invention is not limited to the following examples.

Example 1

Production of Porous Structural Layer

A soda lime glass (NSG Precision, Inc.) was treated with plasma at a rate of 1 cm$^2$/s by using a plasma generator.

A screw-top tube (A), in which 0.64 g of pure water, 1.5 g of triethylene glycol, 0.78 g of isopropyl alcohol and 0.3 g of sulfuric acid were charged, and a screw-top tube (B), in which 8.04 g of tetraethoxy silane (ethyl silicate 40, Colcoat Co., Ltd.) and 0.78 g of isopropyl alcohol were charged, were heated in a water bath maintained at 25° C.

The content of the screw-top tube (A) was put into the screw-top tube (B), and the mixture was stirred at 1500 rpm. After the temperature in the screw-top tube (A) reached 30° C. (peak temperature), the stirring was further continued for 30 minutes.

After the stirring, a fraction (5.0 g) of the solution in the screw-top tube (A) was collected into a screw-top tube (C), and 20 g of isopropyl alcohol was added thereto. The mixture was stirred at 1500 rpm for 1 minute.

The plasma-treated soda lime glass (□ 100 mm) was spin-coated by 1.5 ml of the mixed solution in the screw-top tube (C) in the air maintained at a temperature of 25° C. and a humidity of 60% at a rotation speed of 100 rpm for 3 seconds, at 500 rpm for 5 seconds and then at 1000 rpm for 15 seconds by using a spin coater (K359D-1 SPINNER, Kyowa Riken Co., Ltd.).

The spin-coated soda lime glass was placed flat and dried in the air for 2 minutes and then in a dry oven at 150° C. for 1 hour. Thereafter, the glass sample was allowed to cool to room temperature in the dry oven.

Thereafter, the glass sample was calcined in a muffle furnace (Muffle Furnace FP410, Yamato Scientific Co., Ltd.) at 500° C. for 1 hour and then allowed to cool to room temperature in the muffle oven. The porous structural layer was thus formed.

Surface Modification

A fluorine modifier (FLUOROSURF FG-5020, Fluoro Technology Corp.) was refluxed at a temperature of 60° C. for 1 hour to modify the surface part of the porous structural layer.

The soda lime glass with the modified surface part of the porous structural layer was dried in a dry oven at 150° C. for 1 hour and then allowed to cool to room temperature in the dry oven. Thereafter, the sample was soaked in a fluorine solvent (NOVEC7100, 3M Corp.) and washed with an ultrasonic cleaner (BAKUSEN W-113 Mk-II, Yamato Scientific Co., Ltd) in a BAKUSEN mode (24 kHz and 31 kHz superimposed) for 5 minutes.

Impregnation

The non-volatile liquid (KRYTOX GPL103, Du Pont Corp.) (0.011 g) was applied onto the soda lime glass that had been washed with ultrasonic waves. The sample was left for 1 hour to allow the non-volatile liquid to be retained in the pores of the porous structural layer. The antifouling structure was thus produced.

Example 2

The antifouling structure was produced in the same manner as Example 1 except that the reflux time in the surface modification was changed to 2 hours.

Example 3

The antifouling structure was produced in the same manner as Example 1 except that the reflux time in the surface modification was changed to 4 hours.

Example 4

The antifouling structure was produced in the same manner as Example 1 except that the reflux time in the surface modification was changed to 16 hours.

Example 5

The antifouling structure was produced in the same manner as Example 1 except that the surface modification was performed by vacuum vapor deposition of a fluorine modifier (OPTOOL DSX, Daikin Industries, Ltd.) to a target film thickness of 10 nm.

Example 6

The antifouling structure was produced in the same manner as Example 5 except that the target film thickness of the vacuum vapor deposition was 20 nm.

Example 7

The antifouling structure was produced in the same manner as Example 1 except that the surface modification was performed by immersion in a fluorine modifier (FLUOROSURF FG-5020, Fluoro Technology Co., Ltd.) for 48 hours.

Example 8

The antifouling structure was produced in the same manner as Example 7 except that the porous structural layer was changed to the following layer.

Preparation of Porous Structural Layer

A soda lime glass was treated with plasma at a rate of 1 cm$^2$/s by using a plasma generator.

Into a screw-top tube (A), 1.04 g of pure water, 1.65 g of triethylene glycol, 0.78 g of isopropyl alcohol and 0.2 g of sulfuric acid were charged. Further, into a screw-top tube (B), 11.25 g of tetraethoxy silane (Tetr-thoxysilane, min. 98%, TEOS, Wako Pure Chemicals, Co.) and 0.78 g of isopropyl alcohol were charged.

The content of the screw-top tube (A) was put into the screw-top tube (B), and the mixture was stirred at 1500 rpm. The stirring was stopped when the temperature in the screw-top tube (A) reached 39.9° C. (peak temperature).

A fraction (5.0 g) of the solution in the screw-top tube (A) was collected into a screw-top tube (C), and 20 g of isopropyl alcohol was added thereto. The mixture was stirred at 1500 rpm for 1 minute.

The plasma-treated soda lime glass (□ 100 mm) was spin-coated by 1.5 ml of the solution in the screw-top tube (C) at a rotation speed of 100 rpm for 3 seconds, at 500 rpm for 5 seconds and then at 1000 rpm for 15 seconds.

The spin-coated soda lime glass was placed flat and dried in a dry oven at 150° C. for 1 hour and allowed to cool to room temperature in the dry oven.

Thereafter, the glass sample was calcined in a muffle furnace at 500° C. for 1 hour and then allowed to cool to room temperature in the muffle oven. The porous structural layer was thus formed.

Example 9

The antifouling structure was produced in the same manner as Example 7 except that the porous structural layer was changed to the following layer.

Preparation of Porous Structural Layer

A soda lime glass was treated with plasma at a rate of 1 cm$^2$/s by using a plasma generator.

Into a screw-top tube (A), 0.68 g of pure water, 1.5 g of triethylene glycol, 0.78 g of isopropyl alcohol and 0.8 g of sulfuric acid were charged. Further, into a screw-top tube (B), 80.04 g of tetraethoxy silane (ethyl silicate 40, Colcoat Co., Ltd.) and 0.78 g of isopropyl alcohol were charged. The screw-top tubes (A) and (B) were heated in a water bath maintained at 25° C.

The content of the screw-top tube (A) was put into the screw-top tube (B), and the mixture was stirred at 1500 rpm. After the temperature in the screw-top tube (A) reached 31.7° C. (peak temperature), the stirring was further continued for 30 minutes.

A fraction (5.0 g) of the solution in the screw-top tube (A) was collected into a screw-top tube (C), and 20 g of isopropyl alcohol was added thereto. The mixture was stirred at 1500 rpm for 1 minute.

The plasma-treated soda lime glass (□ 100 mm) was spin-coated by 1.5 ml of the solution in the screw-top tube (C) in the air maintained at a temperature of 25° C. and a humidity of 60% at a rotation speed of 100 rpm for 3 seconds, at 500 rpm for 5 seconds and then at 1000 rpm for 15 seconds.

The spin-coated soda lime glass was dried in a dry oven at 150° C. for 1 hour and then allowed to cool to room temperature in the dry oven.

Thereafter, the glass sample was calcined in a muffle furnace at 500° C. for 1 hour and then allowed to cool to room temperature in the muffle oven. The porous structural layer was thus formed.

Comparative Example 1

The antifouling structure was produced in the same manner as Example 1 except that the reflux time in the surface modification was changed to 30 minutes.

Comparative Example 2

The antifouling structure was produced in the same manner as Example 1 except that the surface modification was not carried out.

Comparative Example 3

The antifouling structure was produced in the same manner as Example 5 except that the target film thickness of the vacuum vapor deposition was changed to 100 nm.

Comparative Example 4

A non-volatile liquid (KRYTOX GPL103, Du Pont Corp.) (0.011 g) was applied onto a soda lime glass, and the sample was left for 1 hour. The antifouling structure was thus produced.

Evaluation of Performance

The initial performance and the performance after a sliding resistance test of the antifouling structures of Example 1 to Example 9 and Comparative Example 1 to Comparative Example 4 were evaluated by the following evaluating methods. The evaluation results are shown in Table 1.

Evaluation of Droplet Sliding Property

Figure 4:
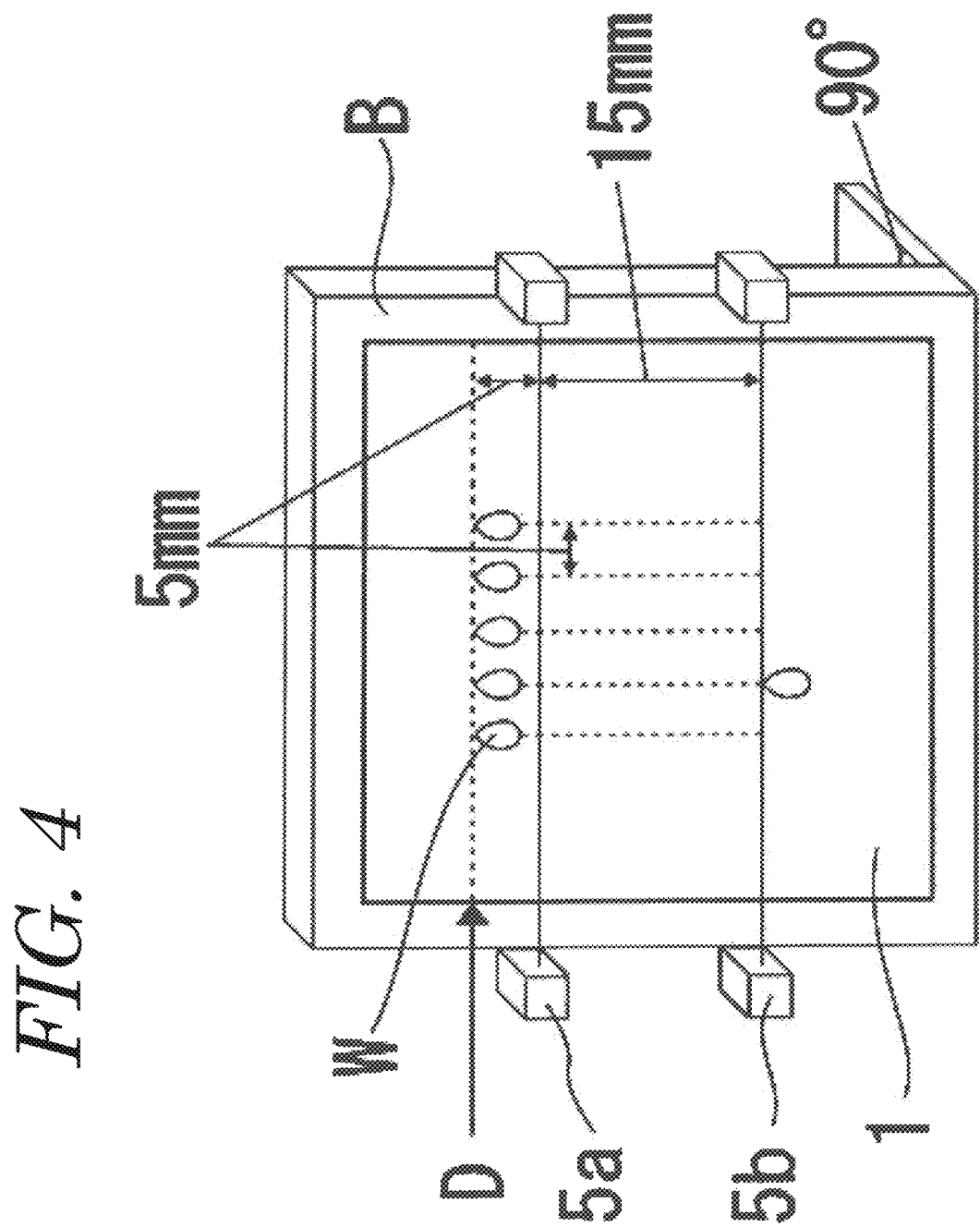
FIG. 4 illustrates a method of evaluating droplet sliding property.

The droplet sliding property was evaluated by placing the antifouling structure 1 in a vertical position, dropping a 5-μL of water thereon and measuring the sliding speed of the water droplet W as illustrated in FIG. 4.

To measure the sliding speed of the water droplet W, infrared sensors 5a, 5b are disposed at an interval of 15 mm. Five droplets were dropped at 5-mm intervals in the horizontal direction at a droplet starting height D, which is 5 mm up from the upper infrared sensor. The average sliding speed of the droplets passing through the 15 mm interval was measured, and the average of the five droplets was calculated.

A (very good): The sliding speed of a water droplet was equal to or greater than 5 mm/sec.

B (good): The sliding speed of a water droplet was faster than 1 mm/sec and equal to or slower than 5 mm/sec.

C (average): The sliding speed of a water droplet was faster than 0 mm/sec and equal to or slower than 1 mm/sec.

D (poor): The sliding speed of a water droplet was 0 mm/sec.

Durability Test

As a test of resistance to sliding abrasion, the above-described evaluation of the initial droplet sliding property was carried out after a nanofiber cloth was reciprocally slid on the antifouling structures for 500 times.

TABLE 1

| | Film Thickness of Porous Structural Layer (nm) | Average pore diameter (nm) | Surface Roughness (nm) | Fluorine Modification | Modification Condition |
|---|---|---|---|---|---|
| Example 1 | 350 | 20 | 7.41 | Yes | Reflux |
| Example 2 | 350 | 20 | 7.41 | Yes | Reflux |
| Example 3 | 350 | 20 | 7.41 | Yes | Reflux |
| Example 4 | 350 | 20 | 7.41 | Yes | Reflux |
| Example 5 | 350 | 20 | 7.41 | Yes | Vapor Deposition |
| Example 6 | 350 | 20 | 7.41 | Yes | Vapor Deposition |
| Example 7 | 350 | 20 | 7.41 | Yes | Immersion |
| Example 8 | 350 | 50 | 8 | Yes | Immersion |
| Example 9 | 280 | 48 | 5.67 | Yes | Immersion |
| Comparative Example 1 | 350 | 20 | 7.41 | Yes | Reflux |
| Comparative Example 2 | 350 | 20 | 7.41 | No | None |
| Comparative Example 3 | 350 | 20 | 7.41 | Yes | Vapor Deposition |
| Comparative Example 4 | 0 | None | 5 | No | None |

| | F/Si (Elemental Ratio) | Viscosity of Antifouling Liquid (mm2/sec) | Haze (%) | All-Optical Transmittance (%) | Evaluation Result Initial | Evaluation Result After Sliding Resistance Test |
|---|---|---|---|---|---|---|
| Example 1 | 3.3 | 80 | 0.4 | 94 | A (very good) | A (very good) |
| Example 2 | 5.8 | 80 | 0.4 | 94 | A (very good) | A (very good) |
| Example 3 | 6.5 | 80 | 0.4 | 94 | A (very good) | A (very good) |
| Example 4 | 7.1 | 80 | 0.4 | 94 | A (very good) | A (very good) |
| Example 5 | 11.3 | 80 | 0.5 | 93 | A (very good) | C (average) |
| Example 6 | 15.9 | 80 | 0.5 | 93 | A (very good) | C (average) |
| Example 7 | 3.2 | 80 | 0.4 | 94 | A (very good) | B (good) |

TABLE 1-continued

| | | | | | | |
|---|---|---|---|---|---|---|
| Example 8 | 4.5 | 80 | 0.4 | 94 | A (very good) | C (average) |
| Example 9 | 3.1 | 80 | 0.2 | 94 | A (very good) | C (average) |
| Comparative Example 1 | 1.8 | 80 | 0.4 | 94 | D (poor) | D (poor) |
| Comparative Example 2 | 0 | 80 | 0.7 | 94 | D (poor) | D (poor) |
| Comparative Example 3 | 56 | 80 | 0.5 | 93 | A (very good) | D (poor) |
| Comparative Example 4 | 0 | 80 | 0.3 | 94 | D (poor) | D (poor) |

Comparative Example 1 did not exhibit an antifouling effect from the beginning since it had an F/Si of less than 3 and the non-volatile liquid did not wet the surface part of the porous structural layer. Comparative Example 3 experienced a decrease of the antifouling effect after the sliding resistance test since it had an F/Si of greater than 50.

Example 1 to Example 4, which had an F/Si within the range of 3.3. to 7.1, exhibited very high antifouling effect even after the sliding resistance test.

REFERENCE SINGS LIST

1 Antifouling structure
2 Porous structural layer
21 Pores
3 Modified portion
31 Non-modified portion
4 Non-volatile liquid
41 Smooth surface
S Surface part
5a Infrared sensor
5b Infrared sensor
D Droplet starting height
W Water droplet
B Scale

The invention claimed is:

1. An antifouling structure, comprising:
a porous structural layer including
a plurality of pores having an average diameter within a range of 10 nm to 50 nm, and
a surface having a surface part; and
a non-volatile liquid in the pores and/or on the surface of the porous structural layer,
wherein, at the surface part of the porous structural layer, the porous structural layer has:
(i) a modified portion comprising a compound having a fluoride functional group bound to the surface of the porous structural layer, and
(ii) a non-modified portion comprising an inorganic material mainly comprising silicon oxide and at which the surface of the porous structural layer at the non-modified portion is exposed, and not modified by, the compound having the fluoride functional group, and
wherein an elemental ratio of fluorine to silicon (F/Si) being a density of modification by fluorine at the surface part is within the range of 3 to 50, the fluorine is from the compound having the fluoride functional group of the modified portion, and the silicon is from the non-modified portion of the porous structural layer exposed at the surface of the porous structural layer.

2. An antifouling structure, comprising:
a porous structural layer including
a plurality of pores, and
a surface having a surface part; and
a non-volatile liquid in the pores and/or on the surface of the porous structural layer,
wherein, at the surface part of the porous structural layer, the porous structural layer has:
(i) a modified portion comprising a compound having a fluoride functional group bound to the surface of the porous structural layer, and
(ii) a non-modified portion comprising an inorganic material mainly comprising silicon oxide and at which the surface of the porous structural layer at the non-modified portion is exposed, and not modified by, the compound having the fluoride functional group, and
wherein an elemental ratio of fluorine to silicon (F/Si) being a density of modification by fluorine at the surface part is within the range of 3.3 to 7.1, the fluorine is from the compound having the fluoride functional group of the modified portion, and the silicon is from the non-modified portion of the porous structural layer exposed at the surface of the porous structural layer.

3. The antifouling structure according to claim 2, wherein an average diameter of the pores is within the range of 10 nm to 100 nm.

4. The antifouling structure according to claim 1, wherein the modified portion contains an alkoxy oligomer having a fluoride functional group.

5. The antifouling structure according to claim 1, wherein a surface roughness (Ra) of the porous structural layer is within the range of 10 nm to 1000 nm.

6. The antifouling structure according to claim 1, wherein the non-volatile liquid has an evaporation loss in an environment of 120° C. after 24 hours of less than 35%.

7. The antifouling structure according to claim 1, wherein a viscosity at 0° C. of the non-volatile liquid is equal to or less than 160 mm$^2$/s.

8. The antifouling structure according to claim 1, wherein the non-volatile liquid comprises a compound comprising a main chain having a perfluoropolyether.

9. An automotive component with an antifouling structure, comprising the antifouling structure according to claim 1.

10. The antifouling structure according to claim 1, wherein the inorganic material mainly comprising silicon oxide is selected from at least one of quartz glass, soda glass, or borosilicate glass, and the inorganic material contains 60 weight percent or more of silicon oxide.

11. The antifouling structure according to claim 2, wherein the inorganic material mainly comprising silicon oxide is selected from at least one of quartz glass, soda glass, or borosilicate glass, and the inorganic material contains 60 weight percent or more of silicon oxide.

12. A method for preparing an antifouling structure, the antifouling structure comprising:
a porous structural layer including
a plurality of pores having an average diameter within a range of 10 nm to 50 nm, and
a surface having a surface part; and
a non-volatile liquid in the pores and/or on the surface of the porous structural layer,
wherein, at the surface part of the porous structural layer, the porous structural layer has:
(i) a modified portion comprising a compound having a fluoride functional group bound to the surface of the porous structural layer, and
(ii) a non-modified portion comprising an inorganic material mainly comprising silicon oxide and at which the surface of the porous structural layer at the non- modified portion is exposed, and not modified by, the compound having the fluoride functional group, and
wherein an elemental ratio of fluorine to silicon (F/Si) being a density of modification by fluorine at the surface part is within the range of 3 to 50, the fluorine is from the compound having the fluoride functional group of the modified portion, and the silicon is from the non-modified portion of the porous structural layer exposed at the surface of the porous structural layer, the method comprising:
forming the modified portion on the surface of the porous structural layer due to a modifier of the modified portion having a fluorine silane coupling agent.

* * * * *